United States Patent [19]
Anselme et al.

[11] Patent Number: 5,364,534
[45] Date of Patent: Nov. 15, 1994

[54] PROCESS AND APPARATUS FOR TREATING WASTE LIQUIDS

[75] Inventors: Christophe Anselme, Le Vesinet; Isabelle Baudin, Nanterre, both of France

[73] Assignee: Lyonnaise Des Eaux - Dumez, Nanterre, France

[21] Appl. No.: 129,387

[22] Filed: Sep. 30, 1993

[30] Foreign Application Priority Data

Oct. 2, 1992 [FR] France .................................. 92 11699

[51] Int. Cl.$^5$ ............................................ B01D 61/00
[52] U.S. Cl. ..................................... 210/650; 210/660; 210/800; 210/805; 210/195.1; 210/195.2; 210/257.2
[58] Field of Search ............... 210/650, 639, 800, 790, 210/195.1, 195.2, 295, 805, 900, 257.2, 660

[56] References Cited

U.S. PATENT DOCUMENTS

| | | | |
|---|---|---|---|
| 4,525,278 | 6/1985 | Frost, III | 210/650 |
| 4,610,792 | 9/1986 | Van Gils et al. | 210/639 |
| 4,732,859 | 3/1988 | Sugimoto et al. | 210/805 |
| 4,872,991 | 10/1989 | Kartels et al. | 210/651 |
| 5,093,072 | 8/1991 | Hitotsuyanagi et al. | 210/650 |
| 5,154,830 | 10/1992 | Paul et al. | 210/639 |

FOREIGN PATENT DOCUMENTS

| | | | |
|---|---|---|---|
| 2628337 | 9/1989 | France | . |
| 4018994 | 1/1992 | Japan | 210/195.2 |

*Primary Examiner*—Frank Spear
*Assistant Examiner*—Ana Fortuna
*Attorney, Agent, or Firm*—Pollock, Vande Sande & Priddy

[57] ABSTRACT

Process for purifying and filtering fluids, especially water, containing suspended contaminants and using gravity separation means as well as membrane separation means, in a finishing stage, comprising the step of introducing a pulverulent reagent into the fluid stream to be treated downstream of the gravity separation and upstream of the membrane separation, wherein said pulverulent reagent is recycled from the purge of the membrane separation means to the upstream of the gravity separation means.

7 Claims, 1 Drawing Sheet

PROCESS AND APPARATUS FOR TREATING WASTE LIQUIDS

FIELD OF THE INVENTION

The present invention relates to a process and to a device intended for providing for the treatment of a liquid effluent containing especially dissolved contaminants.

BACKGROUND OF THE INVENTION

Such processes and devices use gravity separation means, for example known systems of the clarifier type. It is known that, during treatment of a liquid effluent containing, inter alia, dissolved contaminants, it may be necessary to use additions of pulverulent reactive agents such as especially adsorbing agents (for example active charcoal), ion exchangers and complexing agents. The addition of these reagents to the line for the treatment of the liquid effluent is most often carried out at the same time as another reagent which promotes coagulation, flocculation and gravity separation of the particulate impurities contained in the dissolved contaminants. Such a use thus makes it possible, in a single treatment works, to remove the particulate, colloidal and dissolved impurities from the liquid effluent stream to be treated. However, it is recognized that this type of process is not entirely efficient, the yields of the various processes used not being equal to 100%.

The advent of membrane separation techniques and especially the applications of microfiltration and ultrafiltration to the treatment of liquid effluents containing dissolved contaminants, for example of untreated water, made it possible to improve the overall yield of the clarification operations, the membranes having a separation yield equal to 100% for the particles which are larger than the separating power of the membranes used. This has therefore led to the installation of treatment lines containing gravity separation means and membrane separation means in a finishing stage. The present invention refers to this type of plant.

Plants are already known (FR-A-2,628,337) for purifying fluids by means of membranes in which an adsorbing agent, for example pulverulent active charcoal, is introduced, this adsorbing agent being introduced into the fluid stream to be purified before the filtration membranes.

Plants for the treatment of contaminated water are also known (U.S. Pat. No. 4,610,792) which contain clarification means and membrane separation means, in a finishing treatment. In this known plant, a pulverulent reagent, for example active charcoal, is introduced into the line for treatment of untreated water between the clarification means and the membrane separation means. In this known plant, the pulverulent reagent is recirculated in the filtration loop between the clarification means and the membrane separation means.

Simpler systems for addition of pulverulent reagents are also known according to which the reagent is injected into the treatment line directly upstream of the gravity separation.

In starting from this state of the art, the present invention introduces an improved process and device which in particular makes it possible, as will be seen hereinbelow, to simplify the treatment plants and to improve the yields thereof.

Consequently, the first subject of this invention is a process for purifying and filtering fluids, especially untreated water, containing suspended contaminants and using gravity separation means as well as membrane separation means, in a finishing stage, according to which a pulverulent reagent is introduced into the fluid stream to be treated downstream of the gravity separation and upstream of the membrane separation, this process being characterized in that:

the said pulverulent reagent is recycled from the purge of the membrane separation means to the upstream of the gravity separation means.

According to the present invention, the pulverulent reagent can consist of adsorbing agents, especially active charcoal, ion exchangers or complexing agents.

Another subject of the invention is a device for treatment of a liquid effluent, especially of an untreated water, containing dissolved contaminants, constituting a treatment line containing, in particular, gravity separation means and membrane separation means, in a finishing stage, as well as means which make it possible to introduce a pulverulent reagent into the treatment line, before the membrane separation and downstream of the gravity separation, this device being characterized in that it comprises a loop for recycling the pulverulent reagent, from the purge of the membrane separation means as far as the pipe in which the liquid effluent to be treated moves, upstream of the gravity separation means.

Other characteristics and advantages of the present invention will emerge from the description given hereinbelow with reference to the appended drawings which illustrate an implementational example thereof free of any limiting nature. In the drawings:

DETAILED DESCRIPTION OF THE INVENTION

Figure 1:
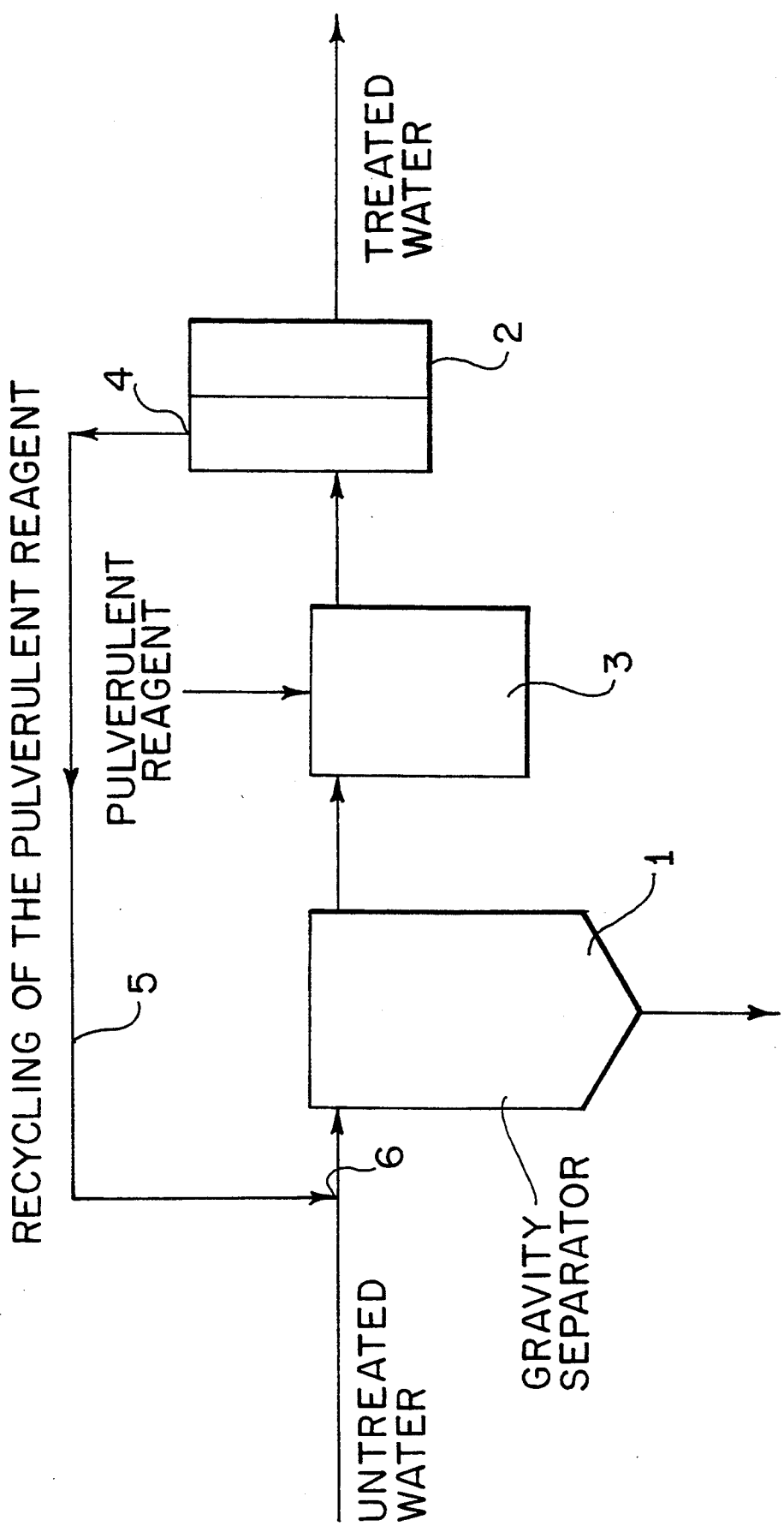
FIG. 1 is a schematic representation of a treatment device using the process which is the subject of the invention.

It is seen, by referring to FIG. 1, that the device according to the present invention comprises, as known, a gravity separation means, denoted by Reference 1, which can consist of a clarifier, and a membrane separation means 2 produced, for example, in the form of micro- or ultrafiltration devices.

According to the invention, this device allows for the introduction of a pulverulent reagent downstream of the gravity separator I and upstream of the membrane separator 2, it being possible for this introduction to be carried out via a recirculation chamber 3. The invention also provides for recycling of the pulverulent reagent arising from the purge 4 of the membrane separator, using a loop 5 which supplies the pulverulent reagent, thus recycled, to a point 6, situated on the pipe for supplying the untreated water, upstream of the gravity separator 1.

Thus, with respect to the known art, as defined especially in U.S. Pat. No. 4,610,792, the invention differs in that the pulverulent reagent is recycled from the purge 4 of the membrane separation 2 to a point situated upstream of the gravity separation means 1, By virtue of this device, the gravity separation/membrane separation system contains only a single outlet for the suspended particles, this outlet consisting of the purge 7 of the gravity separator.

With respect to the other known technique explained hereinabove (FR-A-2,638,337), the invention differs in that, while circulating the pulverulent reagent countercurrentwise with respect to the liquid effluent flow, the upstream operation is a conventional gravity separation operation (for example a clarification) in which the partially exhausted pulverulent reagent is in contact with an untreated fluid (for example untreated water) which thus makes it possible, on the one hand, to exhaust it completely and, on the other hand, to weigh down the flakes.

With respect to the other known processes using the combination: gravity separation means/membrane separation means, the invention introduces in particular the following advantages:

the addition of pulverulent reagents to a clarified effluent (for example a clarified water having a low Total Organic Carbon, TOC) promotes the adsorption of compounds having rapid adsorption kinetics (pesticides), the recycling of the pulverulent reagent, saturated to 50%, from the membrane separation means to the upstream of the gravity separation means (with a long residence time) makes it possible to saturate this pulverulent reagent and to promote the adsorption of the organic compounds having slower kinetics present in the untreated water, the discarded material from the membranes of the membrane separation means, containing the pulverulent reagent, is conveyed to the sludges arising from the gravity separator, which simplifies the problem of the treatment of the sludges from the treatment line.

In order for the advantages introduced by the present invention to emerge better, results are given hereinbelow of comparative tests between, on the one hand, a plant using the process of the invention (in accordance with FIG. 1) and, on the other hand, plants using processes according to the prior state of the art.

In these known plants, the pulverulent reagent is respectively introduced into the treatment line between the gravity separator 1 and the membrane separator 2 and upstream of the gravity separator 1.

The comparative tests, the results of which are given in the table hereinbelow, were carried out on Seine water and the pulverulent reagent used was fresh active charcoal (PAC).

TABLE

|  | Config. 1 FIG. 2 | Config. 2 FIG. 3 | Config. 3 (invention) FIG. 1 | |
| --- | --- | --- | --- | --- |
| PAC Dose mg/l | 30 | 30 | 10 | 25 |
| Flow (1 h$^{-1}$m$^{-2}$) at 20° C. | 200 | 110 | 195 | 200 |
| Backwashing duration/frequency minute/minute | 1/180 | 1/30 | 1/30 | 1/180 |
| Water loss % | <3 | 25 | 15 | <3 |
| TOC, untreated water mg/l | 3 | 3 | 2.9 | 3 |
| TOC, clarified water mg/l | 2 | 1 | 1.4 | 1.2 |
| TOC, filtered water (UF or MF) mg/l | 1 | 0.7 | 1.1 | 0.5 |

The advantages introduced by the process which is the subject of the invention (Configuration 3, FIG. 1) emerge clearly from the examination of the above table. In particular, it is noticed that behaviour equivalent to that of Configuration 1 is obtained but with 10 ppm of PAC in place of 30 ppm and that, at equivalent doses of PAC, Configuration 3 makes it possible to obtain larger flows, reduced water losses and a better quality of water than Configuration 2 (Total Organic Carbon, TOC, much lower).

Of course, it remains that the present invention is not in the least limited to the implementational example and to the embodiment described and mentioned above but that it encompasses all the variants thereof.

We claim:

1. A system for purifying water comprising:
   gravity separation means having an inlet for receiving untreated water having suspended contaminants;
   an outlet of the gravity separation means providing clarified untreated water to a container;
   means for introducing a pulverulent reagent into the container for mixing with the clarified water;
   membrane separation means connected at an inlet thereof to an outlet of the container for separating particles from water;
   a first outlet of the membrane separation means providing treated water flow;
   a second outlet of the membrane separation means connected to the inlet of the gravity separation means for recycling the pulverulent reagent, introduced into the container, thus increasing contact time between the pulverulent reagent and the water being treated;
   the recycled pulverulent reagent being completely extracted from a purge in the gravity separation means.

2. The system set forth in claim 1 wherein the gravity separation means is a clarifier.

3. The system set forth in claim 1 wherein the membrane separation means is either ultrafiltration or microfiltration.

4. A process for purifying water comprising the steps:
   performing gravity separation for initially untreated water, having suspended contaminants, thereby clarifying the untreated water;
   temporarily containing the clarified water;
   introducing a pulverulent reagent into the contained clarified water and mixing with the clarified water;
   allowing reagent mixed water to flow along a treatment path;
   filtering the flowing reagent mixed water for separating particles therefrom;
   tapping a first portion of the filtered water to provide treated water flow;
   recycling the remaining treated water, containing partially spent pulverulent reagent, to mix with initially untreated water thereby increasing contact time between the pulverulent reagent and the water being treated; and
   completely purging recycled pulverulent reagent from the clarified water.

5. The process set forth in claim 4 wherein the pulverulent reagent is selected from the group consisting of: adsorbing agents, ion exchangers, and complexing agents.

6. The process set forth in claim 5 wherein the adsorbing agent is active charcoal.

7. The process set forth in claim 4 wherein the filtering step is accomplished by ultrafiltration or microfiltration.

* * * * *